United States Patent
Purkis

(10) Patent No.: US 12,009,863 B2
(45) Date of Patent: Jun. 11, 2024

(54) OPTICAL COMMUNICATION SYSTEM

(71) Applicant: Well-Sense Technology Limited, Aberdeen (GB)

(72) Inventor: Daniel George Purkis, Dyce (GB)

(73) Assignee: Well-Sense Technology Limited, Aberdeen (GB)

( * ) Notice: Subject to any disclaimer, the term of this patent is extended or adjusted under 35 U.S.C. 154(b) by 0 days.

(21) Appl. No.: 17/899,901

(22) Filed: Aug. 31, 2022

(65) Prior Publication Data

US 2022/0416892 A1 Dec. 29, 2022

Related U.S. Application Data

(63) Continuation of application No. 17/285,195, filed as application No. PCT/GB2019/052920 on Oct. 14, 2019, now Pat. No. 11,469,823.

(30) Foreign Application Priority Data

Oct. 18, 2018 (GB) ..................................... 1816984

(51) Int. Cl.
*H04B 10/25* (2013.01)
*H04B 10/40* (2013.01)
(Continued)

(52) U.S. Cl.
CPC ......... *H04B 10/2589* (2020.05); *H04B 10/50* (2013.01); *H04B 10/66* (2013.01); *H04B 10/40* (2013.01); *H04B 10/60* (2013.01)

(58) Field of Classification Search
None
See application file for complete search history.

(56) References Cited

U.S. PATENT DOCUMENTS

| 4,281,253 A | 7/1981 | Culver |
| 2006/0152383 A1 | 7/2006 | Yamate et al. |

(Continued)

FOREIGN PATENT DOCUMENTS

| WO | WO-2006/070239 A2 | 7/2006 |
| WO | WO-2017/009671 A1 | 1/2017 |

(Continued)

OTHER PUBLICATIONS

Great Britain Search Report for GB Application No. 1816984.7 dated Mar. 25, 2019.

(Continued)

*Primary Examiner* — Darren E Wolf
(74) *Attorney, Agent, or Firm* — Harness, Dickey & Pierce, P.L.C.

(57) ABSTRACT

A downhole optical communications system provided at a downhole location in use, the downhole communications system being for communicating between the downhole location and an uphole location, such as a surface location. The downhole optical communications system comprises a downhole optical transmitter configured to emit an optical signal for transmission over an optical transmission channel between the uphole location and the downhole optical transmitter; wherein the downhole optical transmitter is configured so as to produce a response to an optical signal received from the optical transmission channel and the downhole optical communications system is configured to determine data represented by the received optical signal from the response produced by the downhole optical transmitter.

13 Claims, 6 Drawing Sheets

(51) Int. Cl.
*H04B 10/50* (2013.01)
*H04B 10/60* (2013.01)
*H04B 10/66* (2013.01)

(56) References Cited

U.S. PATENT DOCUMENTS

2007/0062696 A1    3/2007  Wilson et al.
2016/0226618 A1    8/2016  Lee et al.
2018/0363458 A1   12/2018  Stark et al.

FOREIGN PATENT DOCUMENTS

WO   WO-2017/044094 A1   3/2017
WO   WO-2017/151134 A1   9/2017
WO   WO-2018/044470 A1   3/2018

OTHER PUBLICATIONS

International Search Report PCT/ISA/210 for International Application No. PCT/GB2019/052920 dated Dec. 19, 2019.
A. Liu et al. 'Flexible TWDM-RoF system with good dispersion tolerance for downlink and uplink based on additional SCS' *Applied Optics*, 2018, vol. 57, No. 31, pp. 9432-9438.
International Preliminary Report on Patentability for PCT/GB2019/052920 dated Apr. 29, 2021.
Alping entitled "Progdetection Properties of Semiconductor Laser Diode Detectors" *Journal of Lightwave Technology, Inc.*, vol. LT-4, No. 11, Nov. 1986, pp. 1662-1668.

OPTICAL COMMUNICATION SYSTEM

CROSS-REFERENCE TO RELATED APPLICATIONS

This is a continuation of, and claims priority under 35 U.S.C. § 120 to, U.S. application Ser. No. 17/285,195, filed Apr. 14, 2021, which is a continuation of, and further claims priority under 35 U.S.C. § 371 of PCT International Application No. PCT/GB2019/052920 filed Oct. 14, 2021, which claims priority to UK Application No. 1816984.7, filed Oct. 18, 2018, the entire contents of each of which are hereby incorporated by reference.

FIELD

The present disclosure relates to an optical communication system, particularly for use in communicating between downhole and surface locations.

BACKGROUND

Many industries, such as the oil and gas industry, require the deployment of elongate media such as optical fibres within a bore, for example a wellbore, to facilitate applications such as communication, sensing and the like.

In some examples it may be desirable to deploy electrical conductors in a bore. However, there are many benefits to deploying optical fibres in bores, for example to facilitate sensing operations, such as distributed temperature sensing (DTS), distributed pressure sensing (DPS) and distributed acoustic sensing (DAS). Optical fibres can be strong, light, compact and cost effective. Optical fibres may also be used for data communication to/from a bore. In many wellbore applications the optical fibre is deployed as an integral component of a completion string, and thus may be classified as a permanent installation. The costs of including a permanently installed optical fibre system can be significant, and there are also concerns over the longevity of such permanently installed systems.

Fibre line intervention (FLI) systems represent a revolution in approach, using low cost disposable downhole tools that utilise optical fibres. However, the design requirements for such systems is often contrary to those of traditional bulky, high cost, re-usable tools.

Devices that can deployed in a bore can include systems such as sensors and such systems can be active or passive. Active systems can provide a wider range of options and operations but generally require a power supply such as a battery and a means for communicating data, such as sensor data and operating commands and parameters, between the device downhole and a surface location. However, such means for communicating data can often be expensive, overly complex, bulky and lack the necessary robustness.

SUMMARY

A first aspect of the present disclosure relates to a downhole optical communications system, configured to be provided at a downhole location in use, for communicating between the downhole location and an uphole location, such as a surface location, wherein the system comprises:

a downhole optical transmitter configured to emit an optical signal for transmission over an optical transmission channel between the uphole location and the downhole optical transmitter; wherein the downhole optical transmitter is configured so as to produce a response to an optical signal received from the optical transmission channel and the downhole optical communications system is configured to determine data represented by the received optical signal from the response produced by the downhole optical transmitter.

The downhole optical communications system may be configured to provide two-way communications, i.e. both uplink and downlink.

The response may be indicative of the data encoded in the optical signal. The data represented by the received optical signal may be or comprise a control command and/or parameter, e.g. for controlling at least one device or component. The response may be a response to a downlink optical signal received by the downhole optical transmitter from the uphole location.

The downhole optical communications system may comprise, be comprised in or be in communication with a processing system. The processing system may be configured to monitor the downhole optical transmitter to determine the response, e.g. whilst the downhole optical transmitter is unpowered or operating at a power level below an operating or turn-on threshold of the downhole optical transmitter. The processing system may be configured to monitor the downhole optical transmitter to determine the response whilst the downhole optical transmitter is powered or operating to emit light or regardless of whether or not it is in a light emitting state or not. The response may be an electrical response. The response may be generated by the downhole optical transmitter. The response may be, comprise or be indicative of a variation in electrical property of the downhole optical transmitter, such as a change in resistance or impedance. The electrical response may be or comprise generation of an electrical potential and/or may cause an electrical current to flow.

The downhole optical communications system may be switchable from a dormant or unpowered state to an active or powered state upon receiving the optical signal. The downhole optical communications system may comprise an electrical switch component. The response produced by the downhole optical transmitter may comprise generation or variation of an electrical potential that may be provided to the electrical switch component to cause the electrical switch component to switch states to thereby connect a power supply. The downhole optical communications system may be passively powered up or switched on, e.g. using optical signals sent via the fibre optic line and received using the downhole optical transmitter. The passive power up or switch on may take place whilst the downhole optical transmitter and/or downhole optical communications system is unpowered or switched off.

The electrical switch component may be or comprise a transistor, such as a field effect transistor (FET), or other electrical switch. The electrical switch component may be selectively operable, e.g. selectively and/or reversibly switchable from an un-operational (or high impedance) to an operational (or low impedance) state, by the response. The electrical switch component may default to the un-operational (or high impedance) state, e.g. when unpowered. The electrical switch component may be arranged such that the switching of the electrical component to the operational state by the response connects a power supply, e.g. to at least one active electrical component of the downhole optical communications system (such as the processing system and/or the downhole optical transmitter), to the downhole tool and/or to the at least one device (e.g. sensor). Upon being connected to the power supply, the processing system may be configured to latch the electrical switch component persistently into the operational state, e.g. using power supplied from the power supply. The electrical switch component may be selectively switchable from the operational state to the un-operational state (e.g. by the processing system, which may comprise applying a 0V or other signal to the electrical switch component), which may be responsive to a corresponding control command, which may be received by the downhole optical transmitter. The downhole optical communications system, the downhole tool and/or any devices may be unpowered whilst the electrical switch component is in the un-operational state.

In this way, the downhole optical communications system, the downhole tool in or on which it is provided and/or any devices in communication therewith, may be placed in an unpowered or dormant state in order to conserve battery life but may be selectively "woken up" by an optical signal sent from the surface or other remote location.

For example, the electrical switch component may be a high impedance transistor and the downhole optical communications system may be configured such that the electrical potential that is generated as at least part of the response is fed to a gate of the transistor. This may cause the transistor to switch from high impedance to low impedance states, e.g. between a source and drain of the transistor. This may connect a power source to at least one active electrical component of the downhole optical communications system (such as the processing system and/or the downhole optical transmitter) and/or the at least one device. The processing system may be configured such that, upon coupling the at least active electrical component (e.g. the processing system) to the power supply, the processing system may enable an electrical signal from the power supply to be provided to the gate of the transistor so as to latch it in the operational (e.g. conducting) state. The system, tool and/or device may be powered down by the processing system applying a 0V or other suitable signal to the gate of the transistor responsive to a corresponding control signal received via the downhole optical transmitter, which may result in power from the power supply being cut.

The processing system may be configured to control the downhole optical transmitter to modulate light emitted by the downhole optical transmitter in order to form the optical signal, e.g. for uplink transmission. The optical signal may be a modulated optical signal. The optical signal may encode data for transmission. The data for transmission may comprise data received from and/or collected by at least one device, such as a sensor, that is comprised in, connected to or otherwise in communication with the controller.

For example, the at least one device may be, comprise or be comprised in one or more sensors, motors, drivers, valves, actuators, shutters, monitoring devices, gauges, and/or the like.

The downhole optical transmitter may be a solid state device, such as a solid state light emitter. The downhole optical transmitter may be or comprise an electrical component, such as a diode. The downhole optical transmitter may be or comprise a semiconductor component, e.g. a semiconductor light emitter configured to emit light. The downhole optical transmitter may be or comprise a laser. The downhole optical transmitter may be or comprise a laser diode (LD) or a light emitting diode (LED). The component may be arranged to receive optical signals from the uphole optical transmitter via the optical communications channel. The component may be arranged to provide the response dependent on the optical signals received by the component via the optical communications channel.

The downhole optical communications system may not comprise a dedicated optical receiver, e.g. for receiving optical communications received over the optical communications channel. The downhole optical transmitter may be configured to be a unitary device. The downhole optical transmitter may be wired or connected to the processing system by electrical connections, which may be arranged such that the same electrical connections are used to both control the downhole optical transmitter to emit light to produce the optical signal and to receive the response at the processing system from the downhole optical transmitter. The same electrical component, e.g. diode, of the downhole optical transmitter may emit light to form the optical signals and receive optical signals and generate the response thereto. The downhole optical transmitter may be a unitary device, i.e. a common unitary or singular solid state and/or semiconductor element that may function as both a transmitter and receiver, and the transmitter may not comprise different transmitter and receiver elements.

The downhole optical transmitter may be configured such that at least one data transmission property of the downhole optical transmitter may be better, e.g. one, two, three, five or ten or more orders of magnitude better than the corresponding data receiving property. The data transmission property and the corresponding data receiving property may be or comprise at least one of: a maximum data rate, maximum signal intensity, maximum signal amplitude, signal fidelity, switching speed, error rate (e.g. the bit error rate BER) and/or the like. The disparity in the data transmission property may and the data receiving property of the downhole optical transmitter may be the result of a fundamental physical property of the downhole optical transmitter (e.g. rather than simply due to selective operation).

The optical transmission channel may be comprised in the downhole communications system. The optical transmission channel may be locatable along a bore, e.g. a wellbore, in use. The optical communications channel may be or comprise a fibre optic line. The fibre optic line may comprise a single optical fibre or more than one optical fibre, e.g. an optical fibre bundle. At least part or all of the fibre optic line may be a shared, i.e. common, fibre optic line portion configured for two way communication, i.e. to carry both uplink and downlink optical signals, which may be carried in the same optical fibre or fibres. The shared fibre optic line portion may be a portion of the fibre optic line closest to the downhole optical transmitter, e.g. comprising the end of the fibre optic line closest to the downhole optical transmitter. The shared fibre optic line portion may comprise at least part, e.g. less than all or all, of the length of the optical fibre line, e.g. at least 50% or 90% or more of the optical fibre line.

The fibre optic line may be permanently optically coupled to the downhole optical transmitter. The fibre optic line may comprise no splitter that splits the fibre optic line into two separate fibre optic lines, or at least may comprise no splitter on a portion of the fibre optic line towards the downhole optical transmitter and/or configured to be locatable downhole in use. The fibre optic line may not be coupled to a switch, such as an optical or physical switch, for selectively optically coupling the downhole optical transmitter to the fibre optic line. The downhole optical transmitter may configured to transmit signals to and receive signals from the shared fibre optic portion without switching, e.g. without optical switching and/or physical switching, and/or without connecting or reconnecting the shared fibre optic portion.

The downhole communications system may be comprised in a downhole tool, such as a fibre line intervention (FLI)

tool. The device or component may be comprised in, provided on or communicatively coupled to the downhole tool.

A second aspect of the present disclosure relates to an optical communications system for communicating between a downhole location and an uphole location, such as a surface location, wherein the optical communications system comprises:

the downhole optical communications system of the first aspect; and
the optical communications channel between the uphole location and the downhole optical transmitter;
an uphole optical transmitter located at the uphole location in use and configured to transmit an optical signal to the downhole optical transmitter of the downhole optical communications system via the optical communications channel; and/or
an uphole optical receiver located at the uphole location in use and configured to receive an optical signal from the downhole optical transmitter of the downhole optical communications system via the optical communications channel in use.

The optical transmission channel of the downhole optical communications system may be configured to carry optical signals from the uphole optical transmitter to the downhole optical transmitter of the downhole optical communications system and/or carry optical signals from the downhole optical transmitter of the downhole optical communications system to the uphole optical receiver.

The uphole optical receiver and the uphole optical transmitter may be selectively couplable to the optical communication channel. A single communications channel, e.g. a single fibre optic line or single optical fibre, may extend between the downhole optical transmitter and the uphole location. The shared fibre optic line portion of the fibre optic line (e.g. the bidirectional portion of the fibre optic line that carries both uplink and downlink optical signals) may extend between the downhole optical transmitter and the uphole location. The system may be arranged so as to selectively switch, e.g. physically and/or optically switch, between the uphole transmitter or the uphole receiver being optically coupled to the optical communications channel. The fibre optic line may be configured so as to be selectively uncoupled from and coupled to the uphole optical transmitter and/or the uphole optical receiver. In this way, it may be possible to switch between a downlink configuration in which the fibre optic line is coupled to the uphole optical transmitter and an uplink configuration in which the uphole optical receiver is coupled to the fibre optic line.

The system may comprise an optical switch for optically switching between the uphole optical transmitter or the uphole optical receiver being optically coupled to the communications channel. The system may comprise a physical switch for physically switching between the uphole optical transmitter or the uphole optical receiver being optically coupled to the communications channel.

The uphole optical receiver and the uphole optical transmitter may be simultaneously coupled to the optical communication channel, e.g. to the fibre optic line. The optical communications channel may comprise a split, e.g. where the shared optical fibre line portion splits into two or more branch portions of the optical fibre line. The shared optical fibre line portion may be towards and/or coupled to the optical downhole transmitter. The two or more branch portions of the optical fibre line may be provided towards and/or coupled to the uphole location. One of the two or more branch portions of the optical fibre line may be provided towards and/or coupled to the uphole optical transmitter, e.g. the branch portion may be the portion of the optical fibre line that initially receives the optical communication signal from the uphole optical transmitter. Another of the two or more split communications channels may be provided towards and/or optically coupled to the uphole optical receiver, e.g. the other branch portion may be the portion of the optical fibre line that emits the optical communication signal from the optical downhole transmitter to be received by the uphole optical receiver.

The downhole optical transmitter may be comprised in a downhole tool, such as a fibre line intervention (FLI) tool. The optical communications channel may be or comprise one or more fibre optic lines of a FLI tool. The downhole tool may be a disposable downhole tool. The downhole tool may be an active tool, which may comprise one or more devices such as one or more sensors, motors, drivers, valves, actuators, shutters, and/or the like. The one or more devices may be or comprise electronics and/or optical devices, for example. The downhole tool may comprise an energy storage or generation system, such as an electrical energy storage or generation system, e.g. a battery. The downhole tool may comprise a controller, which may comprise at least one processor, data storage and a communications module. The control electronics may be configured to control the at least one device. The processing system may be comprised in the controller, e.g. the processing system of the downhole communications system may be a functional module implemented by the controller. The controller may be configured to receive data from the at least one device. The communications module of the controller may be coupled to the downhole optical transmitter for receiving the data therefrom and/or providing the data thereto. The data may comprise control commands or parameters. The data may comprise sensor data, operational data and/or logging data.

In downhole applications, it may be necessary for a downhole tool, such as an FLI tool, to send uplink data to, and also to receive control commands on a downlink from, the surface or other uphole location. However, such downhole communications arrangements may be overly complex, expensive, bulky and lack a sufficient robustness.

A realisation of the present inventors was that there may be a very limited number of control commands that need sent. In contrast, a downhole tool may often collect large amounts of data that needs to be sent to the surface or other uphole location. As such, there may be a large difference in the uplink and downlink rates required.

The present disclosure describes examples in which, at the downhole end, the optical fibre may be coupled to a transmitter and may not comprise a dedicated receiver. The transmitter may exhibit some form of discernible response to received light signals, albeit that response (e.g. the magnitude, response time, fidelity, and/or the like) may be worse than the corresponding transmission property as an inherent function of the construction of the transmitter.

By using what would be considered in the art to be purely a transmitter also as a receiver, even though the transmitter has what may be considered to be very poor performance as a receiver, the present inventors have realised that it may be possible to construct a system that has certain benefits, such as one or more of: a simpler, more robust, lower cost, lower bulk and more reliable system. In particular, the downhole tool may comprise a transmitter but not a receiver, where the transmitter may also be used to receive signals. This may remove the need for a dedicated receiver and also may remove the need for expense and complexity adding features such as more than only optical fibre, and/or at least one split in the optical fibre, and/or any switching mechanism in order to couple the downhole optical transmitter to the shared optical fibre that forms the communications channel to the surface or other location. Furthermore, the controller of the downhole tool may have a single connection to the transmitter and may be operable to both transmit and receive using the same device, which may further simplify the electronics connections.

According to a third aspect of the present disclosure is a method of operating a communications system according to the first aspect, the method comprising:

sending uplink data by operating the downhole optical transmitter to emit an optical signal that encodes data so as to transmit the optical signal over the optical transmission channel; and receiving downlink data by determining a response from the downhole optical transmitter upon the downhole optical transmitter receiving an optical signal from the optical transmission channel and determining the downlink data from the response.

The method may comprise determining a control command from the determined response. The method may comprise operating or controlling operation of a downhole tool, a component of the downhole tool and/or a device comprised in or connected to the downhole tool, responsive to the determined control command. The method may be carried out by a processing system or controller of the downhole tool, such as the processing system or controller described above in relation to the first or second aspects.

According to a fourth aspect of the present disclosure is a computer program product configured such that, when run on a processing system or controller causes the processing system or controller to perform the method according to the third aspect.

The computer program product may be embodied on a non-transitory computer readable medium.

According to a fifth aspect of the present disclosure is a downhole tool, such as a fibre line intervention (FLI) tool, comprising the downhole communications system of the first aspect.

The optical communications channel may be or comprise or be comprised in one or more optical fibres of the FLI tool. The downhole tool may be a disposable downhole tool. The downhole tool may be an active tool, which may comprise one or more devices such as one or more sensors, motors, drivers, valves, actuators, shutters, and/or the like. The one or more devices may be or comprise electronics and/or optical devices, for example. The downhole tool may comprise an energy storage or generation system, such as an electrical energy storage or generation system, e.g. a battery pack. The downhole tool may comprise a controller, which may comprise at least one processor, data storage and a communications module. The controller may be configured to control the at least one device. The controller may be configured to receive data or other signals from the at least one device. The communications module of the controller may be coupled to the downhole optical transmitter for receiving data therefrom and/or providing data thereto.

The downhole tool may comprise at least one spool. The one or more fibre optic lines may be spooled on the at least one spool. The one or more optical fibres may be spoolable onto, and/or despoolable from, the spool. The downhole tool may be disposable.

The individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

Aspects of the present disclosure relate to an optical communications system for two way optical communication between a downhole location and an uphole location, typically at the surface. Such an optical communication system is particularly beneficial when incorporated into a downhole tool that uses bi-directional optical communications. One particular example of such a downhole tool is a fibre line intervention (FLI) tool that is a disposable tool that may be dropped into a bore and comprises fibre optic spooling apparatus configured such that a fibre optic line may be deployed from the spooling apparatus as the tool traverses through the bore. However, the communications apparatus is not limited to this application and may be used in many other downhole applications or environments that use downhole bi-directional optical communications. For the purposes of the present description the downhole tool provided by way of example only is for use in deploying a fibre optic line within a wellbore, wherein the fibre optic line provides a communications channel between a downhole location (e.g. the downhole tool) and an uphole location (such as a surface location).

Figure 1:
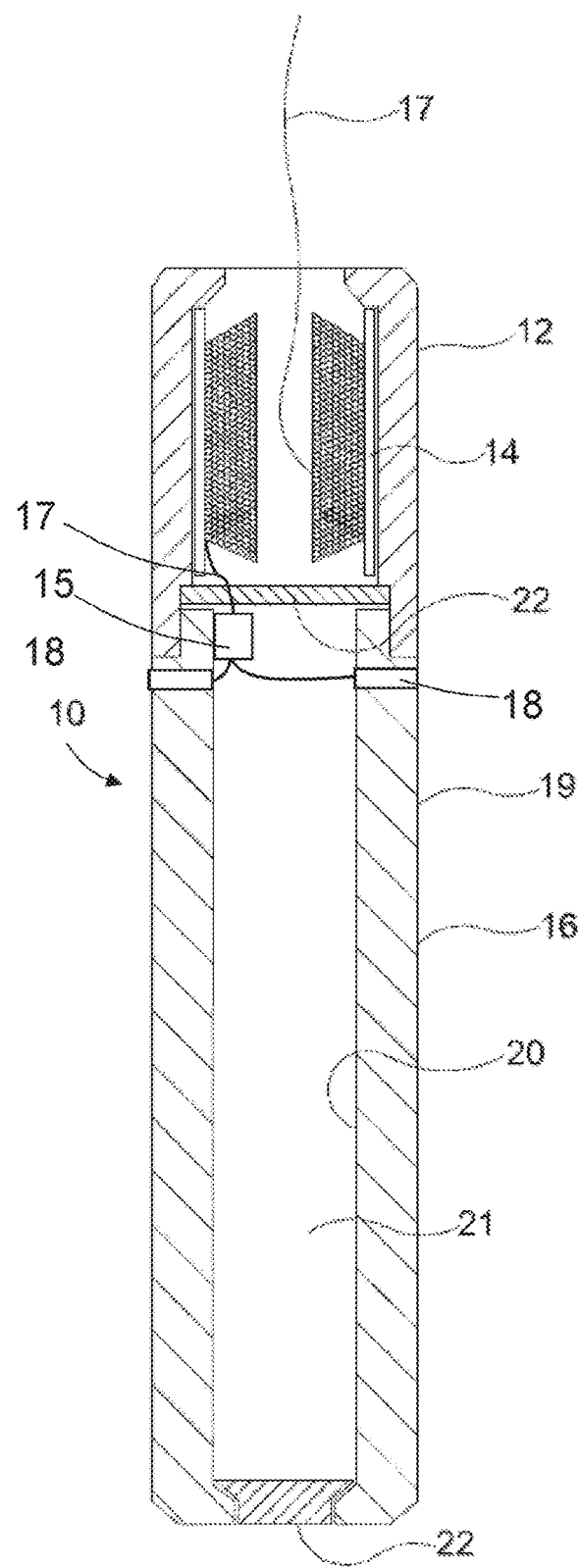
FIG. 1 is a sectional view of a device for deployment in a wellbore.
Figure 2:
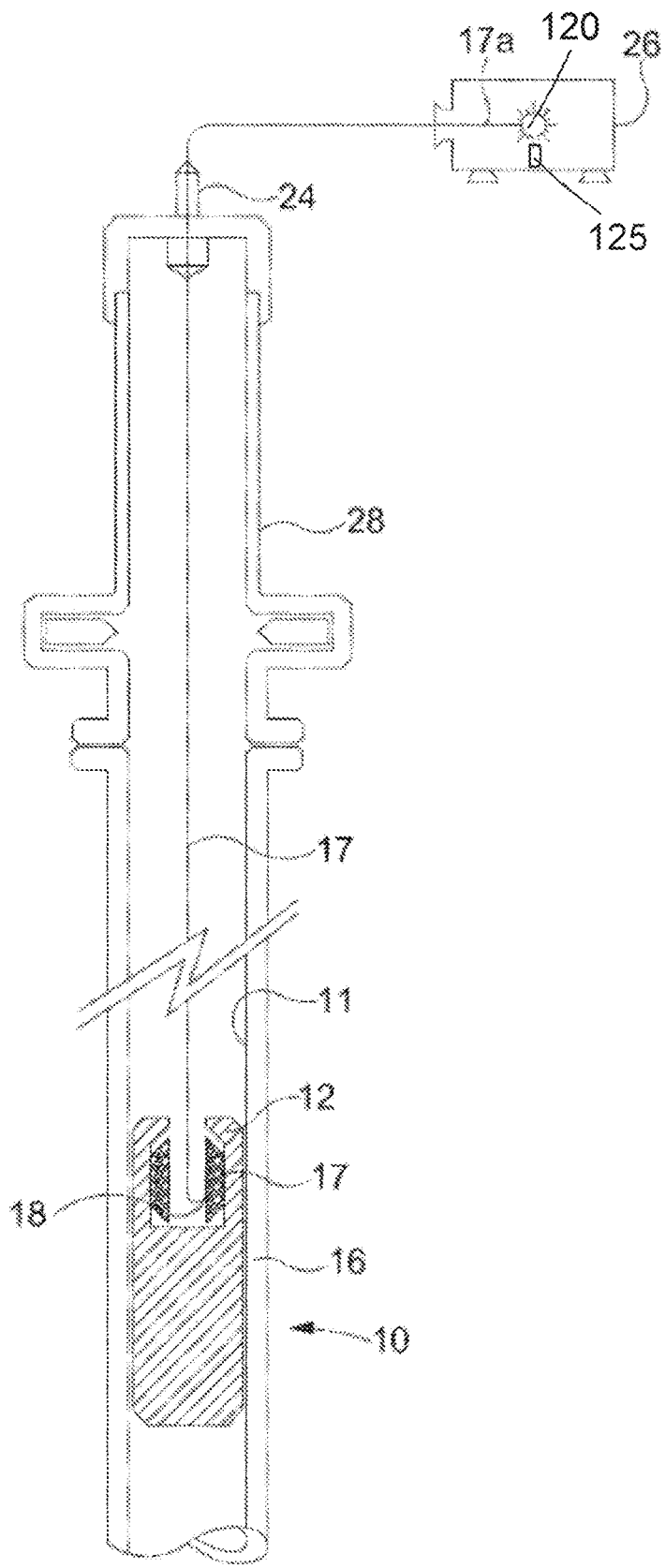
FIG. 2 is a diagrammatic illustration of the device of FIG. 1 being deployed through a wellbore.

FIGS. 1 and 2 provide simplified, diagrammatic, longitudinal, cross-sectional views of a wellbore device, in this particular example an FLI tool, generally identified by reference numeral 10, in accordance with an embodiment of the present invention. FIG. 1 shows a cross section of the wellbore device 10, whilst FIG. 2 shows the wellbore device 10 in a wellbore.

The wellbore device 10 comprises a frame or housing 12 comprising a container 14 mounted thereon. Within the container 14 is packaged in a first configuration a fibre optic deployable member 17. The fibre optic 17 is arranged to be deployed from this first configuration upon deployment of the wellbore device 10 within a wellbore (see FIG. 2).

The wellbore device 10 further comprises a first disposable tool 16 which in the embodiment disclosed is a drift 16. However, it will be appreciated that the tool 16 is not limited to a drift but could be any suitable form of passive or active tool, such as a data logger or other sensing device. For example, the tool 16 may beneficially be an active tool that comprises a controller 15 and comprises or is connectable to one or more devices 18 such as sensors, for collecting data such as environmental, wellbore, fluid flow, formation and/or tool data coupled to the controller 15. The devices 18 are not limited to sensors and may be any other suitable operational device such as a valve, actuator, and/or the like.

The drift 16 is mounted to the frame 12 of the wellbore device 10. The drift 16 comprises a generally cylindrical housing 19 defining a hollow interior 20 and end plates 22 for closing the hollow interior. The hollow interior 20 may be filled with any suitable material, including a readily disposable material for adding weight as may be needed. Examples of suitable materials may include natural materials such as sand, rock and rock flour and/or artificial materials such as iron filings, liquid metal, dissolving plastic beads and the like generally indicated in the volume 21. At least one of the end plates 22 may be removably mountable to the housing 19 to allow ready opening of the drift 16 so that it may be filled with a suitable disposable material to add weight to the drift 16. Different materials may be used depending on the overall desired weight. The housing 19 and the end plates 22 may be made of a disposable material such as a low cost plastic material including but not limited to a polyolefin such as polypropylene and/or polyethylene. The housing 19 and the end plates may be made of a dissolvable material such as a dissolvable plastic material which may dissolve in water and/or oil. The selection of the precise plastic material may depend upon the conditions of the well including but not limited to the type of fluid contained in the well. Hence for example, if the well contains water then a water soluble material may be used for the housing 19 and/or the end plates 22 of the drift 16. If the well contains hydrocarbons then an oil soluble material may be used for the housing 19 and/or the end plates 22 of the drift 16. Other well conditions such as the temperature and acidity of the fluid in the well may be considered in selecting a suitable dissolvable material.

It should be also understood, that although the drift 16 is shown in the embodiment of FIG. 1 having a hollow cylindrical shape filled with a weight material, that other shapes and configurations may be employed without departing from the scope of the present invention. For example, the drift may be made of a solid cylinder made of a dissolvable material, or the drift may be made of a solid cylinder made of an outer housing made of a slower tougher dissolvable material and an inner core made of a faster dissolvable material. Many other variations may be envisioned by a skilled person in this art after having read the present disclosure without departing from the scope of the present invention.

For example, although, the wellbore device 10 as shown in FIG. 1 is equipped with a fibre optic line, it should be understood that other types of deployable members may be provided in addition to the fibre optic line without departing from the scope of the invention. For example, the deployment member 17 may comprise one or more lines made from Vectran and/or Kevlar fibres, monofilament polymer, steel, copper, glass fibre or any other material that can be formed into a wire, thread, line or braid. For example, the deployment line 17 may include a first fibre optic line providing data and/or signal communication and a second line for providing adequate mechanical support for the wellbore device. The deployment line 17 may also be spooled around a bobbin or spool.

Various materials and or techniques may be used to control deployment or unintentional unwinding of the deployable member 17. For example, a wax, varnish, lacquer, grease or any other material with semi sticky properties may be applied on the loaded deployment member to keep the deployable member from deploying unintentionally. Also, for example, a friction device may be operably connected close to the launch point to provide a friction force to prevent unintentional unwinding of the deployable member.

The deployable member 17 may include an electrical component in addition to the fibre optic component to provide support for example for control, power and/or data communication as may be needed, but it will be appreciated that this is not essential and that power may instead be provided by a battery, turbine device, dynamo or other power source provided in the tool 16 whilst data and control command communications may be provided by the fibre optic line.

According to one embodiment, the deployment member 17 may be made from a material that degrades or dissolves in the presence of wellbore fluids. The deployment member 17 may exhibit a sufficiently high strength, thermal stability and low stretch or deformation for supporting the weight of the wellbore device under the wellbore ambient temperature conditions. The deployable member 17 may exhibit a sufficiently high strength, thermal stability and low stretch or deformation for supporting the self-weight of the deployable member 17 when it is fully unspooled and suspended in a well under the wellbore ambient temperature conditions. The deployable member 17 may exhibit a sufficiently high strength, thermal stability and low stretch or deformation for supporting the flow induced forces caused by the fluid flow around and along the deployable member suspended in the well as injection and/or fracturing fluids are pumped into the well.

Referring now to FIG. 2, an application of the wellbore device 10 will be described. The wellbore device 10 may be introduced within a wellbore 11. Tubular 28 is a diagrammatic simplified illustration of a wellhead region and comprises a device 24 such as a lubricator or stuffing box 24 for entering the wellbore device inside the well head. Device 24 may also be a ball or dart launcher, a deployment head or any other suitable device for entering the wellbore device 10 inside the well head.

A first end 17a of the deployable member 17 is anchored through the lubricator 24 by a fibre optic feed through connector and is connected to a surface module 26. The other end is located in the container 14.

The wellbore device 10 as shown in FIG. 2 may be deployed within the wellbore via gravity, however, it should be understood that other methods of deployment may be employed such as, for example, via fluid pumping or a combination thereof. Fluid pumping may be employed, for example, in deviated or horizontal wellbores.

The drift 16 may confirm clear passage to a given depth for other tools such as intervention tools that may follow. As the wellbore device 10 is being deployed into the well the fibre optic 17 is also deployed. Optionally, the fibre optic 17 may be released and allowed to remain in the well. The wellbore device 10 may be employed to drift and log the wellbore at the same time. Accordingly, a first region such as first end 17a of the fibre optic line 17 may be operably connected to a fibre optic surface module 26 comprising a surface transmitter comprising a light source and a surface receiver comprising an interrogator. Any suitable fibre optic module may be used including a DTS, DPS, or DAS module all being commercially available from a number of suppliers. For example if a DTS module is used, the temperature of the fibre optic at all locations along its length may be measured from the surface. The temperature profile of the well may be logged either during deployment or during retrieval of the fibre optic. As indicated above, the wellbore device 10 may comprise one or more sensors or other devices, which may need to convey data to the surface module 26. Furthermore, the wellbore device 10 may optionally comprise one or more devices, such as one or more sensors, motors, drivers, valves, actuators, shutters, and/or the like. Examples of possible sensors may include, for example, a pressure sensor, a temperature sensor, a CCL sensor, a gamma ray sensor, an ultrasonic wall thickness sensor, a calliper gauge, a cement bond sensor and the like. Other sensors may also be used. At least some of the devices may be controllable devices and at least some of the devices may be data producing devices.

Figure 7:
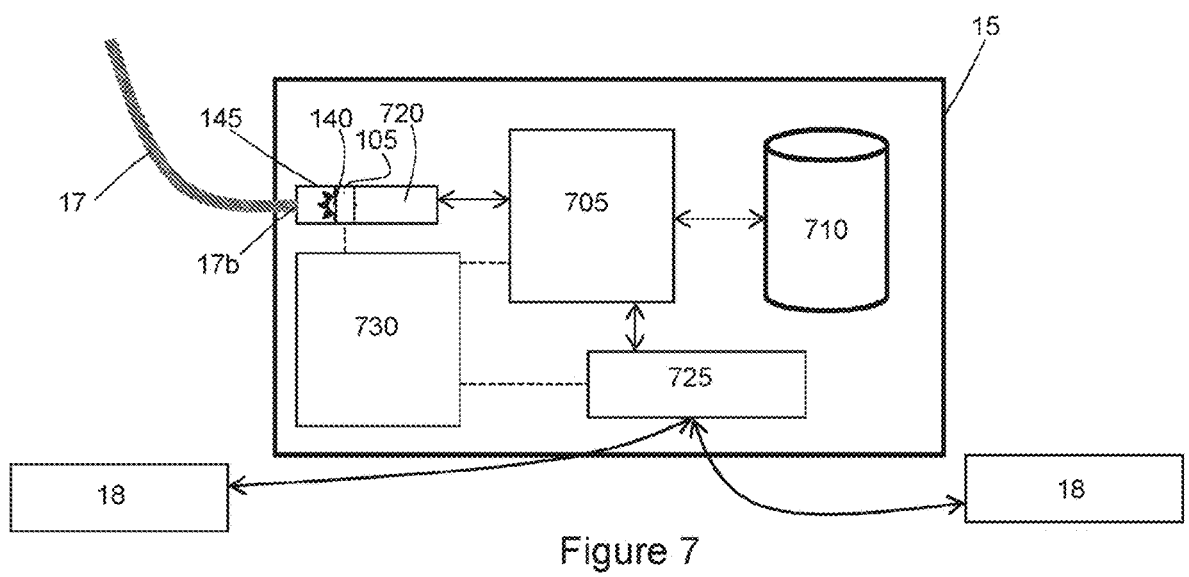
FIG. 7 is a diagrammatic illustration of the optical communications system of FIG. 6 in a second (downlink) configuration.

As described above in relation to FIG. 1, the wellbore device 10 comprises a controller 15, which may be or comprise an electronic controller. As shown in FIG. 7, the electronic controller 15 may comprise one or more processors 705, configured to implement an operating program, data storage 710 for storing data such as data from the data producing devices 18, and an optical communications module 720. In this case, the controller 15 may be protected within a heat shield arrangement comprising a housing and a phase change material (PCM) filling a hollow space defined between the housing and the controller 15. The controller 15 may be operably connected with one end 17b of the fibre optic via an opening in the housing. The other end 17a of the fibre optic 17 is connected to the surface module 26 shown in FIG. 2.

The controller 15 may comprise or be coupled to the one or more devices 18, e.g. to provide control commands to any controllable devices 18 and to receive data from any data producing devices 18. Data produced by any of the data producing devices 18 may be transmitted by the controller 15 to the surface module 26 via the fibre optic line 17. Conversely, data for controlling any of the controllable devices 18 may be transmitted from the surface module 26 to the controller 15 via the fibre optic line 17. In this way, fibre optic line 17 needs to support bi-directional optical communications, i.e. an uplink for providing data from the controller 15 of the wellbore device 10 to the surface module 26 and a downlink to allow control commands for controlling any of the controllable devices 18 to be provided from the surface module 26 to the controller 15 of the wellbore device 10.

Figure 3:
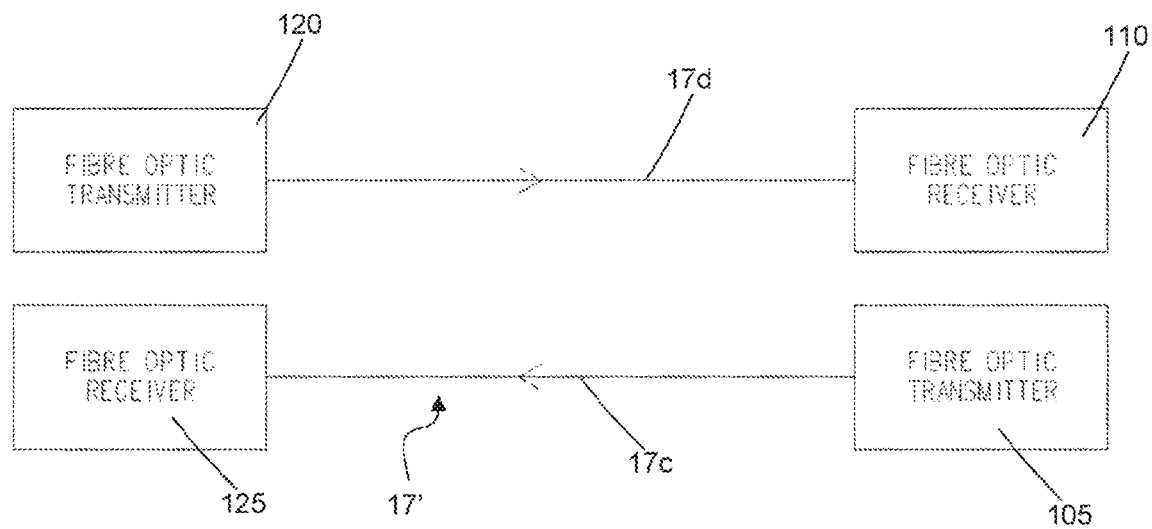
FIG. 3 is a schematic diagram of a processing system or controller of the device of FIG. 1.

One possibility for providing such bidirectional communications is shown in FIG. 3. In this example, the fibre optic line 17' comprises a plurality of optical fibres 17c, 17d. In this arrangement different optical fibres 17c, 17d are used for the uplink and downlink, i.e. the uplink optical fibre 17c and the downlink optical fibre 17d are mutually exclusive. In this example, a downhole optical transmitter 105 and a downhole optical receiver 110 are comprised in the wellbore device 10 (e.g. in the optical communications module 715 of the controller 15, see FIG. 7). A surface optical transmitter 120 and a surface optical receiver 125 are comprised in the surface module 26. In this example, at least the downlink optical fibre 17d exclusively couples the surface optical transmitter 120 in the surface module 26 to the downhole optical receiver 110 of the wellbore device 10 and the different uplink optical fibre 17c exclusively couples the downhole optical transmitter 105 of the wellbore device 10 to the surface optical receiver 125 in the surface module 26. In this example simultaneous bi-directional transmission, i.e. both uplink and downlink, is possible by transmission over the separate uplink and downlink optical fibres 17c, 17d.

Figure 4:
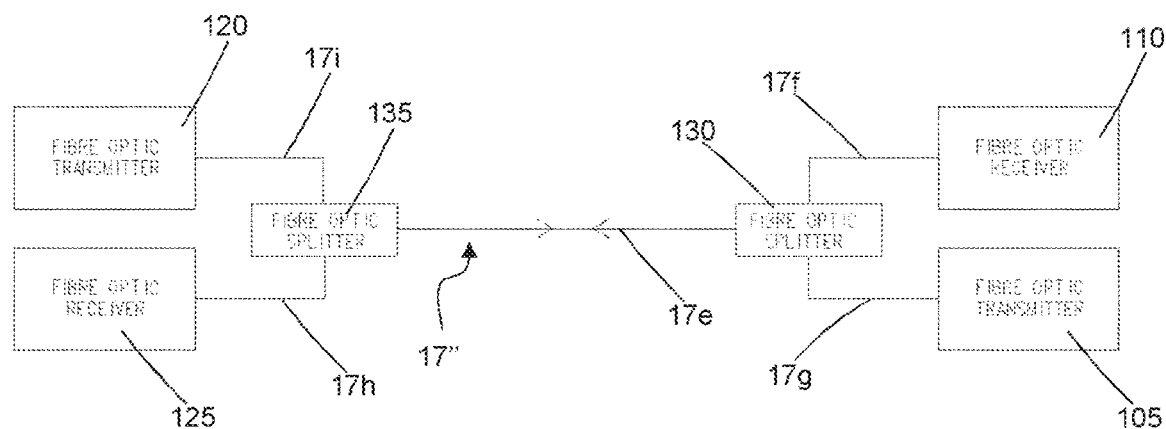
FIG. 4 is a diagrammatic illustration of an optical communications system for communicating downhole.

Another possibility for providing such bidirectional communications is shown in FIG. 4. In this example, the fibre optic line 17" comprises a shared fibre optic line portion 17e over a majority of the length of the fibre optic line 17". The shared fibre optic line portion 17e is a portion of the fibre optic line 17" where both uplink and downlink data is transmitted using the same optical fibre or fibres of the fibre optic line 17". In this example, the fibre optic line 17" is provided with a pair of fibre optic splitters 130, 135, one at each end of the shared fibre optic line portion 17e. The fibre optic splitter 130 at a downhole end of the shared fibre optic line portion 17e couples into two downhole branch optical fibres 17f, 17g, one of the downhole branch optical fibres 17f being coupled to the downhole optical receiver 110 and the other of the downhole branch optical fibres 17g being coupled to the downhole optical transmitter 105. In this way, both the downhole optical transmitter 105 and the downhole optical receiver 110 are coupled to the shared fibre optic line portion 17e via respective dedicated downhole branch optical fibres 17f, 17g. Similarly, the fibre optic splitter 135 at the surface end of the shared fibre optic line portion 17e couples into two separate surface branch optical fibres 17h, 17i, with one of the surface branch optical fibres 17h coupled to the surface optical receiver 125 and the other of the surface branch optical fibres 17i being coupled to the surface optical transmitter 120. In this way, both the surface optical transmitter 120 and surface optical receiver 125 are coupled to the shared fibre optic line portion 17e via respective dedicated surface branch optical fibres 17h, 17i. As such, whilst each of the transmitters 105, 120 and receivers 110, 125 are coupled to a respective dedicated fibre optic 17f, 17g, 17h, 17i, all share a shared fibre optic line portion 17e. In this example, either the uplink and downlink transmissions may be scheduled non-concurrently, i.e. time division, or some other form of signal division can be employed such as frequency/wavelength division (such as orthogonal frequency division multiplexing OFDM), and/or the like.

Whilst the above options can be implemented and used, reducing complexity and cost and increasing the robustness would be beneficial.

Examples of systems that exploit a particularly beneficial arrangement to provide the bidirectional communications using the fibre optic 17 are shown in FIGS. 5, 6, 7 and 8. In these systems, only the downhole optical transmitter 105 is provided at the downhole end 17b of the fibre optic line 17, e.g. in the wellbore device 10 or associated tool 16, and no dedicated downhole optical receiver 110 is provided.

Figure 5:
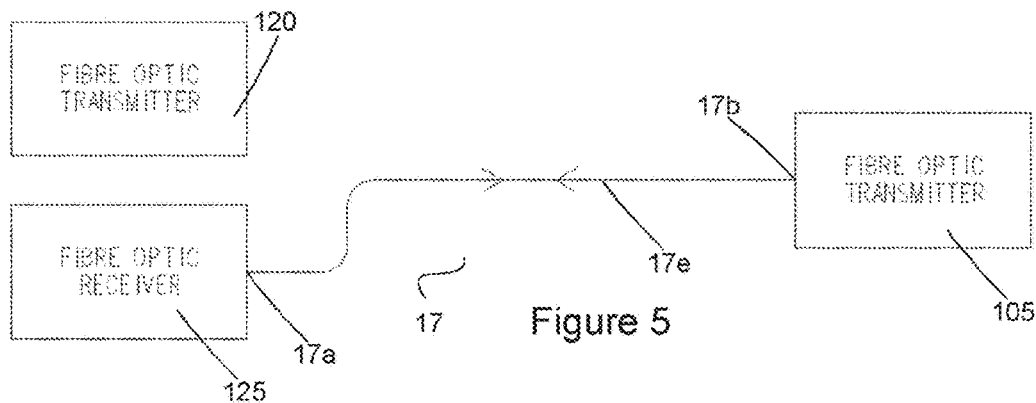
FIG. 5 is a diagrammatic illustration of an alternative optical communications system for communicating downhole.
Figure 6:
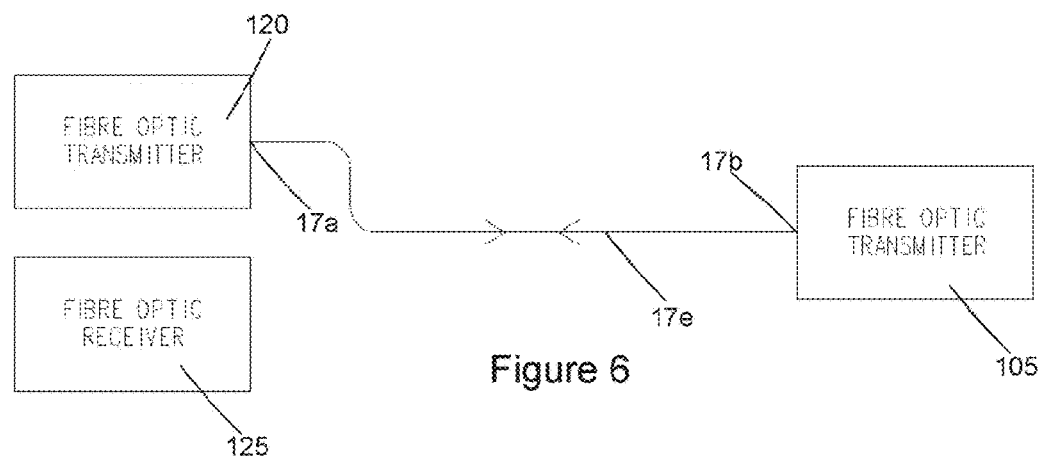
FIG. 6 is a diagrammatic illustration of another alternative optical communications system for communicating downhole in a first (uplink) configuration.

FIGS. 5 and 6 show such an arrangement in which only a downhole optical transmitter 105, but not a dedicated downhole optical receiver 110 is provided at the downhole end 17b of the fibre optic line 17. In this case, although the downhole optical transmitter 105 is or comprises a light emitting electrical component 140, such as a laser diode or LED, that is capable of selectively emitting light in a manner suitable effective optical data transmission (e.g. by being capable of being rapidly switched on and off, or between different amplitudes or frequencies, and/or the like), the light emitting component 140 of the downhole optical transmitter 105 also provides a measurable response to optical signals received by it, albeit the data carrying ability of the response of the light emitting component 140 is generally inherently poorer (e.g. slower, lower amplitude, with less discrete data values possible, and/or the like) than its corresponding transmission properties (e.g. transmission rate, amplitude, number of discrete data values possible, and/or the like). The measureable response could be, for example, the generation of a small electrical current by the light emitting electrical component 140, or a variation in resistance or impedance or other measurable electrical property of the light emitting electrical component 140, wherein the measurable response is dependent on the optical signal incident on the light emitting electrical component 140 (e.g. dependent on the present or otherwise of the optical signal or dependent on a property of the optical signal such as amplitude, intensity, frequency/wavelength, and/or the like). In particular, the response of the light emitting electrical component 140 should be reflective of and dependent on the data modulated on the optical signal. In turn the data can be encoded by modulating the optical signal (e.g. by on-off keying, amplitude modulation, frequency modulation, phase shift modulation, and/or the like) in such a way that the modulation produces a response in the light emitting electrical component 140 of the downhole optical transmitter 105 that reflects the data carried.

The present inventors have realised that the number of possible control commands and parameters that require to be sent on the downlink is generally relatively small. Thus, a high data rate and large range of possible data values may not be required on the downlink. However, the amount of data that needs to be sent on the uplink may be significantly higher than the downlink requirements, as it may need to convey data such as sensor data, tool parameter data, device operating data and/or the like. The downhole communications system illustrated in FIGS. 5 and 6 comprises only the downhole optical transmitter 105 at the downhole end 17b of the optical fibre 17, but not an optical receiver 110, and the shared fibre optic line portion 17e of the fibre optic line 17 extends all the way to an optical coupling 145 with the downhole optical transmitter 105. As such, the downhole optical transmitter 105 is operable as both a transmitter and a receiver. Although the downhole optical transmitter 105 would have what may be considered to be poor operability as an optical receiver, in view of the above, such deficiencies as a receiver may not be overly problematic in this application.

In the arrangement of FIGS. 5 and 6, only the downhole optical transmitter 105 is required for both sending and receiving optical communications, thereby saving the costs and complexity that would otherwise arise from additionally having the dedicated downhole optical receiver 110. Furthermore, it allows only a single consistent optical coupling between the shared fibre optic line portion 17e and the wellbore device 10 without the need for physical or optical switching or a splitter at the downhole end 17b of the fibre optic line 17. This may further reduce complexity, reduce cost and may increase robustness, as the number of potential failure points may be reduced.

The surface module 26 may still comprise both the surface optical transmitter 120 and surface optical receiver 125. In the example of FIGS. 5 and 6, the surface end 17a of the fibre optic line 17 is selectively couplable to (and removable from) one of the surface optical transmitter 120 or the surface optical receiver 125 at any given time, depending on whether it is desired to transmit an optical signal (downlink, as shown in FIG. 6) or receive an optical signal (uplink, as shown in FIG. 7). In this example, the surface end 17a of the fibre optic line 17 can be physically switched by physically selectively coupling it to either the surface optical transmitter 120 (FIG. 6) for downlink or the surface optical receiver 125 (FIG. 7) for uplink. However, it will be appreciated that other techniques such as optical switching between the uplink and downlink configurations at the surface may be provided.

Using this technique, some form of mechanism for distinguishing the uplink and downlink signals is preferable, e.g. as described above. A simple solution to this would be to provide different exclusive time slots for uplink and downlink. The uplink and downlink time slots may alternate with equal durations or may be asynchronous, e.g. have differing durations, e.g. with the uplink time slots being longer than the downlink time slots to better reflect the data flow requirements. In this way, when in an uplink time slot, the controller 15 of the downhole device 10 may be configured to control the downhole optical transmitter 105 (e.g. the laser diode) to emit a modulated optical signal that is modulated to encode data for transmission to the surface optical receiver 120 via the fibre optic line 17. During a downlink time slot, the surface optical transmitter is operable to encode control commands and/or parameters onto an optical signal that is conveyed via the fibre optic line 17 to the downhole optical transmitter 105, which in turn exhibits the response to the received optical signal. The controller 15 of the downhole device 10 is configured to monitor the response of the downhole optical transmitter 105 (e.g. the response of the laser diode).

If a response is received, then the controller 15 is configured to determine data values (e.g. the control command and/or parameter) associated with the particular received response. For example, the data values may be determined from the response by applying a predetermined algorithm or by comparing one or more parameter values or features of the response with those given in a look up table or other dataset to determine a corresponding parameter value or feature in the look up table to thereby identify the data (e.g. control command) represented by the response. However, other mechanisms for correlating the response to the received optical signal with the data carried by the optical signal would be apparent to a skilled person in view of the present disclosure. Once the control command has been determined, the controller 15 is configured to control any device comprised in or associated with the wellbore device 10 according to the determined control command.

The controller 15 is shown in more detail in FIG. 7, which shows a simplified schematic arrangement for the controller 15. In particular, the controller 15 comprises a processing system 705 (which could comprise one or more processors or cores) and data storage 710 for storing programs run by the processing system 705, data collected by any data collecting devices 18 and any data needed by the processing system to perform its operations, such as predetermined look-up tables, algorithms and the like. The processing system 710 is in communication with an interface or integrated electronics 720 of the downhole optical transmitter 105 and configured to signal the interface or integrated electronics 720 of the downhole optical transmitter 105 to control emission of light from the downhole optical transmitter 105 for uplink/transmission and to monitor and determine any responses of the downhole optical transmitter 105 during downlink. The processing system 710 is also optionally connected to a device interface 725 that interfaces with the devices 18, such as data collecting devices and/or operating devices. The processing system 710 is operable to signal the device interface 725 to control the devices 18 to perform actions associated with the control commands received during downlink by the downhole optical transmitter 105 and/or to receive data collected by the devices 18 for uplink to the surface module 26 using the downhole optical transmitter 105. In this particular example, the controller 15 comprises or is connected to a power source 730, such as a battery, for powering the components of the controller 15 such as the processing system 705, the downhole optical transmitter 105, the devices 18 (via the device interface 725) and the data store. Although a battery is beneficially described, it will be appreciated that other power sources such as generators, capacitors, power lines to the surface, and other suitable power sources could be used.

In such systems battery life can be important. In some examples, downhole optical transmitter 105 is operable when unpowered in order to switch the wellbore device 10 between an unpowered (e.g. switched off) and powered (e.g. switched on) state. For example, the downhole optical transmitter 105 may be coupled to an electrical component such as to the gate of a high impedance transistor (or other suitable electrical switch). The downhole optical transmitter 105 is configured to generate an electrical potential on receipt of the optical signal from the fibre optic line 17. In this way, upon receipt of the optical signal, the electrical potential that is generated as at least part of the response of the downhole optical transmitter 105 is fed to the gate of the transistor.

This causes the transistor to switch from high impedance to low impedance between a source and drain of the transistor. The transistor is arranged such that this switch to low impedance connects a power source to at least one active electrical component of the downhole optical communications system (such as the controller 15 and/or the downhole optical transmitter 105) and/or the at least one device 18. The controller 15 is configured such that, upon being connected to the power supply, it enables an electrical signal from the power supply to be provided to the gate of the transistor so as to latch it in the operational (e.g. conducting) state. Operations may then continue in the manner described herein, responsive to control commands and/or parameters sent view the fibre optic line 17 and downhole optical transmitter 105.

The wellbore tool 10 and/or devices 18 may be powered down by the controller 15 applying a 0V or other suitable signal to the gate of the transistor responsive to a corresponding control signal received via the downhole optical transmitter 105, which results in power from the power supply being cut and the wellbore tool and/or devices 18 being returned to the dormant or unpowered state.

Figure 8:
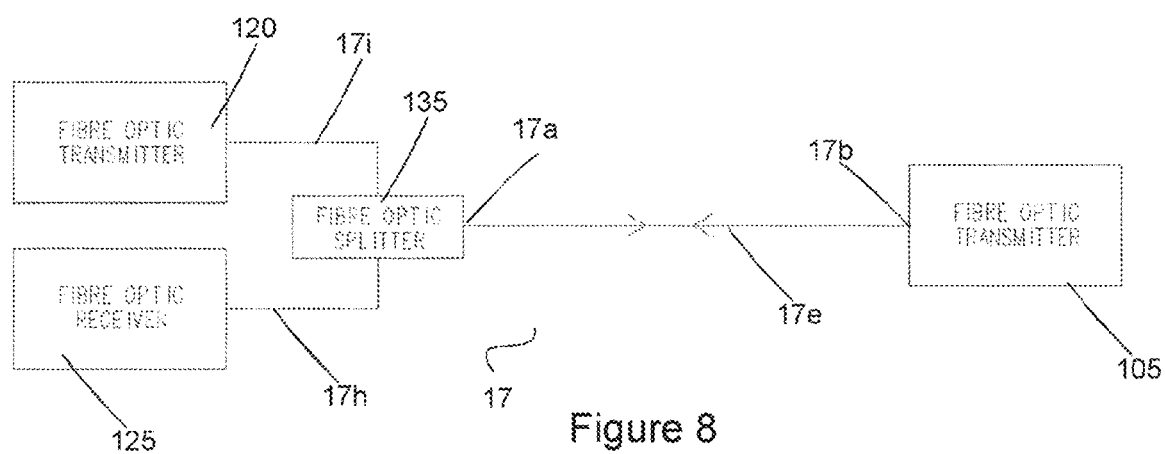
FIG. 8 is a diagrammatic illustration of a further optical communications system for communicating downhole.

An alternative arrangement to those shown in FIGS. 5 and 6 is shown in FIG. 8. As in the example of FIGS. 5 and 6, only a downhole optical transmitter 105 but no downhole optical receiver 110 is provided at the single downhole end 17b of shared fibre optic line portion 17e of the fibre optic line 17. However, in this example, a surface end 17a of the fibre optic line 17 is provided with a fibre optic splitter 135 such that both the surface optical transmitter 120 and the surface optical receiver 125 are coupled to respective surface branch optical fibres 17g, 17h from the fibre optic splitter 135. In this arrangement, no switching is required, but a single fibre optic splitter 135 is required.

Figure 9:
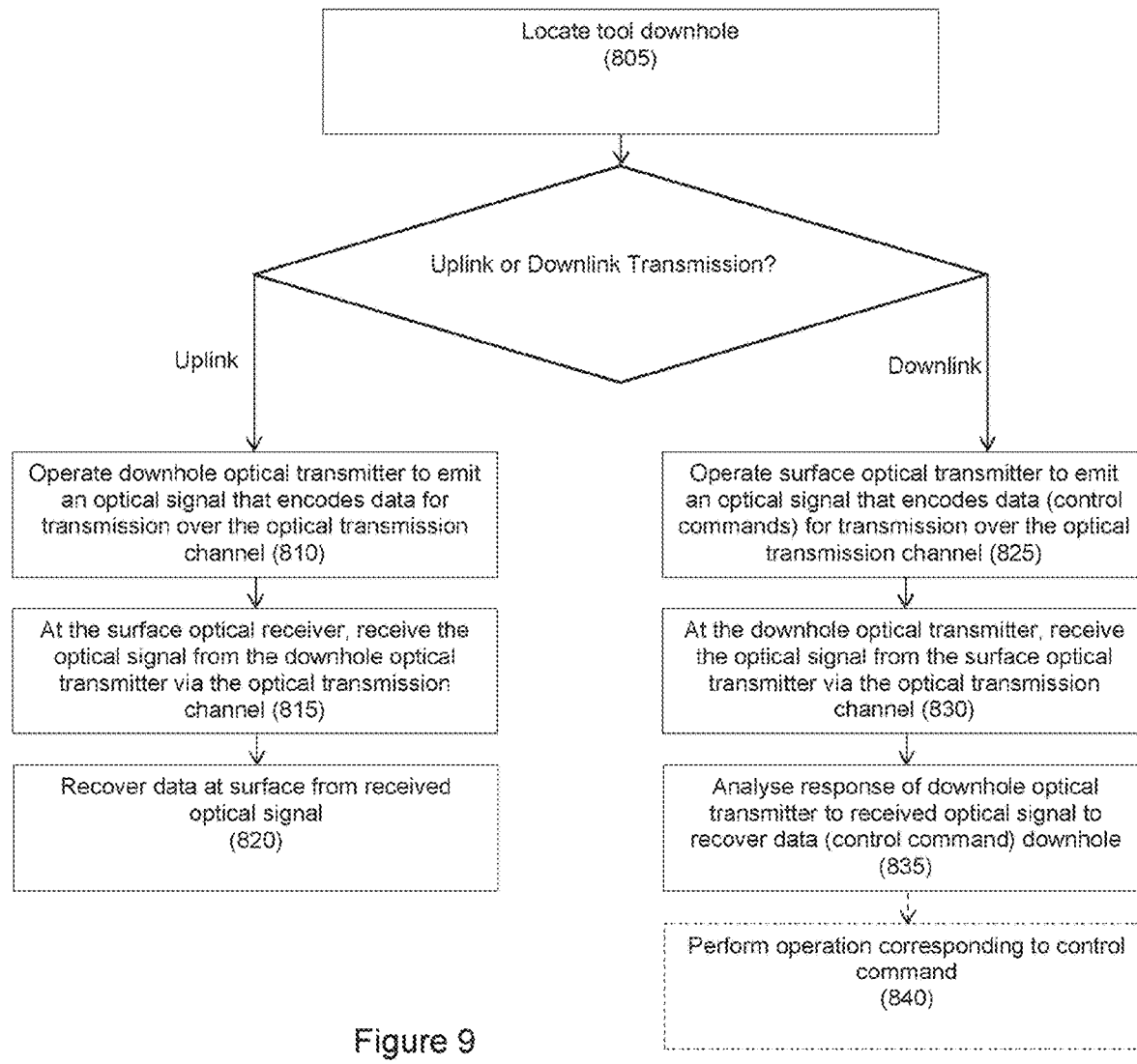
FIG. 9 is a method of operating the optical communications system of any of FIGS. 6 to 8.

A method of providing bidirectional (uplink and downlink) communications using the systems of FIGS. 4, 5, and 7 is described in relation to FIG. 9.

In step 805, the wellbore device 10 is provided downhole. For example, where the wellbore device 10 is a FLI device, the FLI device is dropped downhole and proceeds downhole under the force of gravity, unspooling the fibre optic 17 as it goes until it has reached the required downhole location.

If uplink is required (e.g. during an uplink time slot), then in step 810 the downhole optical transmitter 105 is operated under the control of the controller 15 in order to emit a modulated optical signal encoding data, such as sensor data, for transmission to the surface module 26 or other uphole location. It will be appreciated that the data may optionally but not essentially be digital data and the light may be modulated by any suitable optical communications modulation scheme such as on-off keying (OOK), amplitude shift keying (ASK), phase shift keying (PSK), quadrature phase shift keying (QPSK), quadrature amplitude modulation (QAM) including any suitable constellation size thereof, such as 2-QAM, 4-QAM, 16-QAM, spread spectrum techniques, and/or the like.

The modulated optical signal from the downhole optical transmitter 105 is transmitted via the fibre optic line 17 to be received by the surface optical receiver 125 in step 815. The transmission to the surface optical receiver 125 may be as a result of the surface end 17a of the fibre optic line 17 being physically or optically switched so as to couple to the surface optical receiver 125 rather than the surface optical transmitter 120 (as in FIGS. 5 and 6) or due to the surface fibre optic splitter 135 being present such that the surface optical receiver 125 is coupled to the fibre optic line 17 via a dedicated surface branch optical fibre 17h rather than the shared fibre optic line portion 17e (as in FIG. 8). The modulated optical signal results in a corresponding signal being produced by the surface optical receiver 120, the corresponding signal being indicative of the modulated data carried by the modulated optical signal. The corresponding signal is then passed to a processing device at the surface that is configured to recover the data from the corresponding signal in step 820.

If downlink is required (e.g. during a downlink time slot), then in step 825 an optical signal that represents one or more control commands or parameters is generated and emitted from the surface optical transmitter 120 to the fibre optic line 17. The optical signal propagates through the fibre optic line 17 to be received by the downhole optical transmitter 105, in step 830, wherein the downhole optical transmitter 105 is connected to the single downhole end 17b of the shared fibre optic line 17 during both uplink and downlink. The controller 15 is electrically connected to the downhole optical transmitter 105 in an unpowered or low powered mode that is below an operating turn-on threshold of the light emitting component 140 of the downhole optical transmitter 105 and configured to monitor for any electrical signal from or any variations in the electrical properties of the downhole optical transmitter 105 in order to determine the response of the downhole optical transmitter 105 to the optical signal received from the surface optical transmitter 120. The controller 15 is then configured to analyse the response (e.g. by applying one or more predetermined rules or a look-up table or an algorithm or any other suitable means) in order to determine, in step 835, the control command or parameter associated with the determined response and thereby represented by the optical signal. The control command or parameter can optionally be used by the controller 152 to control a component of the downhole tool 16 or a device 18 comprised therein or connected thereto according to the control command. For example, where the device 18 is a sensor, then the control command may indicate turn on or start data logging or turn off/stop data logging. The control commands can vary depending on the device 18 or component and could include, by way of example, commands to turn on or off, to change operational modes or states of the device, to vary an operating parameter or value, e.g. to increase or decrease power, to switch frequencies, to open or close, and/or the like.

As the response exhibited by the downhole optical transmitter 105 can be a low level response (e.g. lower that the levels of responses that can be determined by dedicated optical receiver devices such as CODs, CMOS receivers, photodiodes, and/or the like), the number of possible detectable states, finesse or fidelity of the downlink optical signal may be significantly less than for the uplink optical signal. However, since relatively few control commands are generally required (e.g. 20, 10, 5 or less), then this may be acceptable. However, sensors, data loggers and other devices that a located downhole can often generate large amounts of data such that large uplink rate and capacity is needed. As such, this asymmetry in data rate where the uplink is one, two, three, four, six or more orders of magnitude greater than the downlink data rate is acceptable.

One benefit of this arrangement is that the downhole optical transmitter 105 can be persistently connected by a single connection to an end 17b of the shared fibre optic line portion 17e that is used for both transmission and reception without any switching or splitter at or towards the downhole end of the fibre optic line 17. Another benefit is that the additional dedicated downhole optical receiver 110 can be dispensed with. These may significantly reduce cost and complexity and increase robustness of the system. This is particularly beneficial when the optical communication system is provided in FLI or other similar downhole tools that are often disposable but can be subjected to extreme physical demands.

Although references are made above to optical signals or light signals, it will be appreciated that these could but not necessarily be visible light signals and/or may encompass other regions of the electromagnetic spectrum such as infrared and/or ultraviolet light. References to fibre optic line above may be or comprise a single optical fibre, or a bundle or other bound, intertwined or grouped together collection of optical fibres optionally encased in a common sheath. Although a laser diode is provided as a particularly beneficial example of an optical transmitter above, it will be appreciated that other suitable optical transmitters such as LEDs could be used. Furthermore, whilst particularly beneficial examples of the use of the concepts described herein in a fibre line intervention (FLI) tool are given, the concepts described herein could also be applied to other devices or situations. As such, the examples given above are provided by way of example and the scope is limited only by the claims.

The invention claimed is:

1. A downhole optical communications system, configured to be provided at a downhole location in use, for communicating between the downhole location and an uphole location, wherein the downhole optical communications system comprises:
   a downhole optical transmitter configured to emit an uplink optical signal for transmission over an optical transmission channel between the downhole optical transmitter and the uphole location; and
   an electrical switch; wherein
   the downhole optical transmitter is configured to produce a response to an downlink optical signal received from the optical transmission channel;
   the downhole optical communications system is configured to determine data represented by the received downlink optical signal from the response produced by the downhole optical transmitter;
   the downhole optical communications system is configured to be switchable from a dormant or unpowered state to an active or powered state upon receiving the downlink optical signal;
   the response produced by the downhole optical transmitter comprising generation of an electrical potential that is provided to the electrical switch to cause the electrical switch to switch states to thereby connect a power supply; and
   the power supply continued to latch the electrical switch into a persistent operational state.

2. The downhole optical communications system according to claim 1 comprising the optical communications channel, wherein the optical communications channel comprises a fibre optic line and at least a part of the fibre optic line that includes an end of the fibre optic line closest to the downhole optical transmitter is a shared fibre optic line portion configured to carry both uplink and downlink optical signals for two way communication in optical fibre or fibres.

3. The downhole optical communications system according to claim 2, wherein a portion of the fibre optic line towards the downhole optical transmitter and/or configured to be locatable downhole in use does not comprise any splitter that splits the fibre optic line into two separate fibre optic lines on and/or the downhole communications system is configured such that the end of the fibre optic line closest to the downhole optical transmitter is persistently connected to the downhole optical transmitter during both uplink and downlink.

4. The downhole optical communications system according to claim 1, wherein the downhole optical communications system is configured to schedule transmission of the uplink and downlink optical signals non-concurrently in different uplink and downlink time slots.

5. The downhole optical communications system according to claim 1, wherein the response is or comprises an electrical response or a change in electrical properties of the downhole optical transmitter.

6. The downhole optical communications system according to claim 1, wherein the downhole optical transmitter is electrical component that is operable to emit light in order to form the optical signals for transmission and provides the response, wherein the response comprises a measurable response dependent on a downhole optical signal incident on the electrical component, the downhole optical signal received from the optical transmission channel, and wherein the downhole optical communications system is configured to determine data represented by the received downlink optical signal from the measurable response produced by the electrical component of the downhole optical transmitter.

7. The downhole optical communications system according to claim 6, wherein the electrical component is or comprises a laser diode or other laser.

8. The downhole optical communications system according to claim 1, wherein there is no dedicated optical receiver at the downhole location that is configured to receive signals from the optical communications channel.

9. An optical communications system for communicating between a downhole location and an uphole location, wherein the optical communications system comprises:
   the downhole optical communications system of claim 1;
   the optical communications channel between the uphole location and the downhole optical transmitter;

an uphole optical transmitter located at a remote location in use and configured to transmit an optical signal to the downhole optical transmitter of the downhole optical communications system via the optical communications channel; and an uphole optical receiver located at the remote location in use and configured to receive an optical signal from the downhole optical transmitter of the downhole optical communications system via the optical communications channel in use.

10. A method of operating a communications system according to claim 9, the method comprising:

sending uplink data by operating the downhole optical transmitter to emit an optical signal that encodes data so as to transmit the optical signal over the optical transmission channel; and receiving downlink data by determining a response from the downhole optical transmitter upon the downhole optical transmitter receiving an optical signal from the optical transmission channel and determining the downlink data from the response.

11. A non-transitory computer readable medium storing a computer program, which when executed by a processing system or controller, causes the processing system or controller to perform the method of claim 10.

12. The downhole optical communications system of claim 1, wherein the uphole location comprises a surface location.

13. The downhole optical communications system of claim 9, wherein the uphole location comprises a surface location.

* * * * *